Feb. 8, 1944. G. A. FRENKEL 2,341,213
PLASTIC PELLETING MACHINE
Filed Jan. 5, 1942
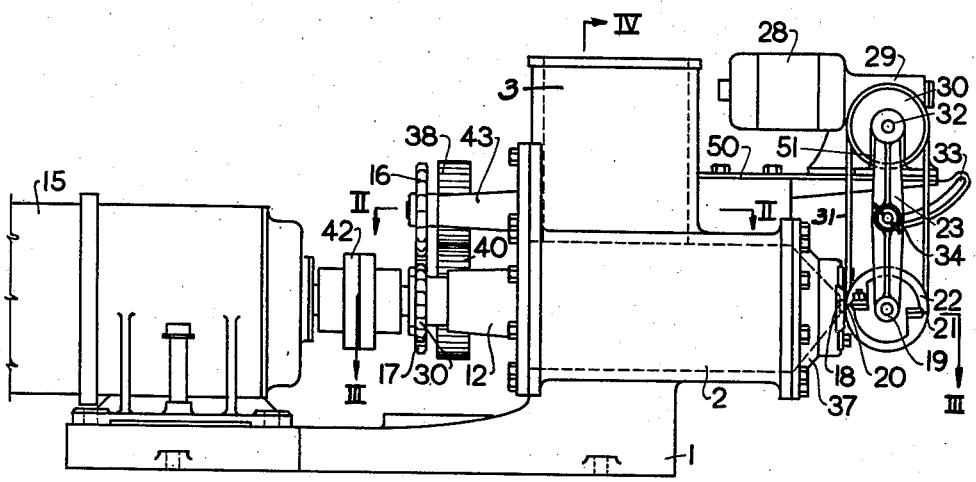
Fig. I
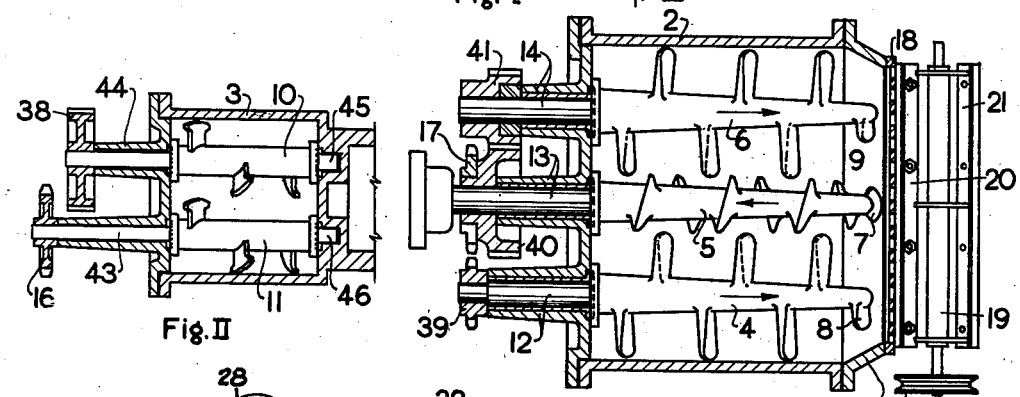
Fig. II Fig. III
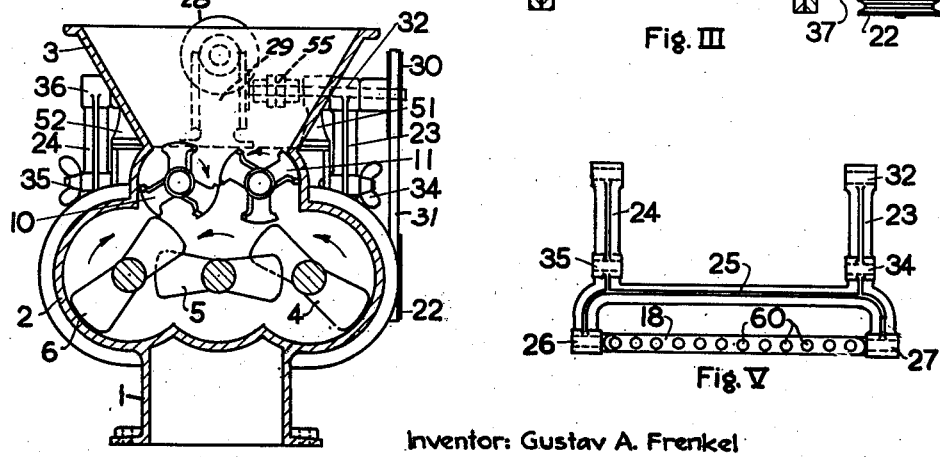
Fig. IV Fig. V
Inventor: Gustav A. Frenkel
By His Attorney H. Birch Patented Feb. 8, 1944

2,341,213

UNITED STATES PATENT OFFICE 2,341,213

PLASTIC PELLETING MACHINE

Gustav A. Frenkel, Oakland, Calif., assignor to Shell Development Company, San Francisco, Calif., a corporation of Delaware Application January 5, 1942, Serial No. 425,624

3 Claims. (Cl. 25—14)

The present invention relates to apparatus suitable for pelleting plastic materials in general and more particularly to apparatus suitable for pelleting plastic materials suitable for use as catalyst carrier bodies.

In the various chemical arts it is common practice to utilize carriers impregnated with various catalytically active materials as catalyst bodies, particularly in the instance of vapor phase reactions. Suitable materials which are used as carrier bodies include, for example, pipe clay, meerschaum, bentonite, bauxite, permutites, majolica, chamotte, alumina, silica gel, metal oxide gels and numerous others of like characteristics and similar properties. In common pelleting practice materials such as the above are moistened sufficiently with a liquid, usually water or a water solution, to form a plastic mass which is then forcibly extruded through a die-plate by means of a continuous worm and finally cut into pellets. The pelleted material is then dried and impregnated with a catalytically active material; or alternatively, may be further processed before drying, as for example as described in my U. S. Patent No. 2,232,444. Although the present invention will be described particularly in relation to its use in the preparation of catalyst carrier bodies, it is to be understood that the spirit and scope thereof are not to be thereby restricted, nor limited to the pelleting of any particular type of material for any particular purpose other than the general pelleting of plastic materials by extruding the same through a die under pressure.

It is an object of the present invention to provide an improved pelleting machine of the general type described above. It is a further object of this invention to provide a pelleting machine which is particularly adapted to the pelleting of plastic materials which are to be used as catalyst carrier bodies. Another object is to provide a pelleting machine wherein a uniform plasticity of the material being pelleted is maintained within the machine and particularly in that region of the machine immediately behind the die-plate. Still further it is an object of the present invention to provide a pelleting machine particularly adapted for the production of pre-pelleted materials suitable for further processing as taught in U. S. Patent 2,232,444.

Other objects, together with some of the advantages to be derived from utilizing the present invention, will become apparent from the following detailed description thereof, reference being had to the accompanying drawing, which constitutes a part of this specification, and wherein:

Figure I is a side elevation of the pelleting machine according to the instant invention; Figure II is a sectional plan view through II—II of Figure I; Figure III is a sectional plan view through III—III of Figure I; Figure IV is a sectional end elevation through IV—IV of Figure I; Figure V is an end elevation showing the detail of the cutter support frame, the cutter not being shown.

In the drawing, a bed-frame 1 is provided on which the machine housing 2 is mounted towards one end thereof, a motor and reduction gear combination 15 being mounted towards the other end thereof. Positioned above and mounted on housing 2 is a feed hopper 3 in the lower portion of which a feeder spider arrangement is mounted. The feeder comprises a pair of non-interlocking modified worms 10 and 11 which are supported by bearing housings 44, 45 and 43, 46, respectively. Gears 38 and 16 are provided on extensions of the shafts forming parts of worms 10 and 11 respectively.

Within the housing 2, three modified interlocking worms 4, 5, 6 are provided which are supported at one end only by bearing and housing arrangements at 12, 13, 14, respectively. Gears 39, 17, 41 are mounted on extensions of the shafts forming part of interlocking worm mesh 5. 5, 6, respectively. Gear 39 is driven by a chain from gear 17. Gear 41 and a ring gear 40, which is also mounted on an extension of the shaft forming part of interlocking worm mesh 5. Thus, all three of the interlocking worms 4, 5, 6, are rotated by motor 15 which drives the extension of the shaft on which interlocking worm 5 is mounted through coupling 42, interlocking worms 4 and 6 turning in opposite directions to each other and interlocking worms 4 and 5 turning in the same direction.

An extrusion head 37 is mounted on housing 2 on the opposite end from the driving gear train described above. On the outside face of extrusion head 37 a die plate 18 is mounted. A bed plate 50, supported by and mounted on hopper 3, in turn supports motor 28 and a reduction gear unit 29. Motors 15 and 28 are both preferably of the variable speed type. Fulcrum supports 51 and 52 are also mounted on bed plate 50 and serve to support a cutter frame comprising side arms 23, 24 and cross bar 25, the cutter frame as a unit being pivotally supported by fulcrum supports 51, 52 as shown particularly in Figure IV. A common shaft is driven by motor 28 through connection 55 and passes through fulcrum support 51, and a pivotal bearing housing 32, which is formed as a part of cutter frame side arm 23, and in turn drives a pulley wheel 30. A cutter wheel comprising a rotatable shaft 19 on which are mounted a pair of cutter blades 20, 21, is supported by the cutter frame by means of bearing housings 26, 27, the cutter wheel being thus disposed below cross bar 25 of the cutter frame. A pulley wheel 22 is mounted on an extension of shaft 19 and connected for driving purposes to pulley wheel 30 by means of a belt or other suitable drive as at 31.

A slotted radius guide 33 is mounted on bed plate 50 as shown in Figure I. A pin passes through cutter frame side arm 23, a suitable bearing housing as at 34 being provided for this purpose, and also passes through the slot in radius guide 33, the outer end of the pin being threaded to receive a locking wing-nut assembly as at 34. A similar arrangement is provided in connection with cutter frame side arm 24, wing-nut assembly 35 being provided as shown partially in Figure IV.

It has been found that in the usual pelleting machines employed for general pelleting purposes, difficulty is encountered in handling certain types of materials, particularly in the pelleting of various materials for use as catalyst carrier bodies. In the usual type of pelleting machine the plastic material is forced against a circular die-plate by means of a single pressure screw arrangement, the extruded material being cut off in pieces of the desired length by means of a rotating circular wire cutter positioned behind the die-plate. When a minimum of moisture is used in preparing the feed plastic, as is done in preparing catalyst carrier bodies, it was found that there is a tendency for the plastic material within the pelleting machine to be squeezed dry by the pressure of the material against the die-plate, thus forming a hard crust immediately behind the die-plate, finally clogging the dies and eventually preventing further extrusion entirely. As a result, due to the variation in angular velocity of the cutting wires of the circular cutter striking the material extruded from the circular die-plate at different radii, in conjunction with the irregularity in extrusion rate as a result of clogging as mentioned above, it was found to be virtually impossible to produce uniform pellets for any length of time.

In the present machine these difficulties have been overcome by providing an arrangement whereby the plastic material within the pelleting machine is continuously recycled at a sufficient rate to prevent accumulation of dry material behind the die-plate, any such material being brought back into the body of the plastic mass and thus being remoistened. Further, uneven cutting is avoided by providing a die-plate having a horizontal series of dies, as shown at 60 in Figure V, and a horizontal revolving cutter associated therewith having steel blades which traverse the front of the horizontal dies. Their position in relation to the dies is such that only the extreme outer edges close to the surface of the die-plate come in contact with the extruded material when rotating, thus cutting it with a shearing action.

The specific operation of the pelleting machine is as follows, having reference to the drawing and the above general description thereof. Premixed plastic material is fed into hopper 3 from whence it is forced into housing 2 by means of the feeder spider 10, 11. The two outer worms 4, 6, within the housing 2, rotate in a direction to force material forward against the die-plate 18. The center worm 5, which is operated at a somewhat slower speed, rotates in a direction to force material backwards away from die-plate 18. As a result of the combined action of the worms 4, 5, 6, and the conical shape of extrusion head 37, a continuous recycling of material within the body of the machine is effected, the flow being from the sides of the machine towards the die-plate and thence towards the center of the die-plate where a portion of the material is picked up and moved backwards by the center worm towards the opposite end of the machine and thence returned along the sides of the machine and towards the extrusion head again. The tail fin 7 of center worm 5 serves no transporting purpose but agitates the material to avoid the presence of air voids.

A somewhat similar effect is obtained in feed hopper 3 by means of the feeder spider arrangement therein. Worm 10, driven by gear 38 which meshes with ring gear 40, rotates in the opposite direction to worm 11 driven by gear 16 through a chain drive to gears 17 and 39, i. e., gears 16, 17 and 39 are all interconnected by the same chain drive. Material in the lower section of feed hopper 3 is thus continuously in countercurrent flow in a horizontal plane and at the same time urged downwardly into the main body of the machine.

The pivotable mounting support of the cutter frame serves a two-fold purpose. The cutter frame assembly may be swung upwardly out of the way when it is desired to remove the extrusion head 37 and proper adjustment and alignment of the cutter wheel with respect to die-plate 18 may be attained.

It has been found that for most purposes, and particularly in the pelleting of catalyst carriers, uniform plasticity in the rear of the die-plate may be obtained by using a recycling ratio of 1:2, i. e., no difficulty with caking on the rear of the die-plate is encountered if approximately 35% by volume of the plastic material fed to the rear of the die-plate is continuously recycled. This factor will of course vary at times under special conditions, requiring a change in the relative speeds of the center worm and the outer worms in order to increase or decrease the amount of material recycled. This may be accomplished by changing the ratio of the driving gears. Alternatively, a center worm of greater or lesser pitch may be substituted.

I claim as my invention:

1. In a plastic pelleting machine the combination comprising a housing, plastic material feed means disposed above said housing, a conical extrusion head mounted on one end of said housing, a die-plate detachably mounted in said extrusion head, said die-plate including a plurality of dies in a substantially horizontal plane therein, a pivotably mounted cutter blade frame disposed adjacent the outer face of said die plate, a rotatable cutter blade mounted in said cutter blade frame and disposed in juxtaposition to the outer face of said die plate and in alignment with said horizontal dies, worm conveyor means disposed within said housing arranged and adapted to urge plastic material forward towards said die-plate and worm conveyor means disposed within said housing arranged and adapted to withdraw plastic material from the vicinity of said die-plate.

2. In a plastic pelleting machine the combination comprising a housing, a feed hopper disposed above and in flow communication with said housing, plastic material feeding means disposed within said feed hopper whereby plastic material is urged downwardly from said feed hopper into said housing, a conical extrusion head mounted on one end of said housing, a die plate detachably mounted in said extrusion head, said die-plate including a plurality of dies in a substantially horizontally plane therein, a pivotably mounted cutter blade frame disposed adjacent the outer face of said die plate, a rotatably mounted cutter blade in said cutter blade frame disposed in juxtaposition to and in alignment with said horizontal dies, worm conveyor means mounted within said housing arranged and adapted to urge plastic material forward towards said die-plate, worm conveyor means disposed within said housing arranged and adapted to withdraw plastic material from the vicinity of said die-plate and an agitator element mounted on said last named worm conveyor adjacent said die-plate.

3. In a plastic pelleting machine the combination comprising a housing including a die-plate having a plurality of dies in a horizontal plane, pressure means adapted to urge plastic material toward said dies, a pivotally mounted cutter blade frame disposed adjacent the outer face of said dies, a cutter blade mounted in said cutter blade frame and disposed in juxtaposition to and in alignment with said horizontal dies and means for passing said cutter blade across the face of said dies whereby plastic material extruded from the dies is periodically sheared.

GUSTAV A. FRENKEL.